US012142118B1

(12) United States Patent
Philbrick et al.

(10) Patent No.: US 12,142,118 B1
(45) Date of Patent: *Nov. 12, 2024

(54) SYSTEM FOR INCENTIVIZING TRANSITION FROM PHYSICAL CARD TO MOBILE PAY

(71) Applicant: United Services Automobile Association (USAA), San Antonio, TX (US)

(72) Inventors: Ashley Raine Philbrick, San Antonio, TX (US); Oscar Guerra, San Antonio, TX (US); Kelly Q. Baker, San Antonio, TX (US); Carlos JP Chavez, San Antonio, TX (US); Yevgeniy Viatcheslavovich Khmelev, San Antonio, TX (US); Theresa Marie Matowitz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,111

(22) Filed: Jul. 10, 2023

Related U.S. Application Data

(63) Continuation of application No. 17/542,898, filed on Dec. 6, 2021, now Pat. No. 11,699,333, which is a continuation of application No. 17/129,230, filed on Dec. 21, 2020, now Pat. No. 11,195,386.

(60) Provisional application No. 62/952,750, filed on Dec. 23, 2019.

(51) Int. Cl.
*G07F 19/00* (2006.01)

(52) U.S. Cl.
CPC .......... *G07F 19/208* (2013.01); *G07F 19/203* (2013.01); *G07F 19/204* (2013.01); *G07F 19/206* (2013.01)

(58) Field of Classification Search
CPC ...... G07F 19/208; G07F 19/203; G07F 9/204; G07F 19/206
USPC .......................................................... 235/379
See application file for complete search history.

(56) References Cited

U.S. PATENT DOCUMENTS

| | | | | |
|---|---|---|---|---|
| 8,714,445 | B1 | 5/2014 | Katz et al. | |
| 11,195,386 | B1 * | 12/2021 | Philbrick | G07F 19/204 |
| 11,699,333 | B1 * | 7/2023 | Philbrick | G07F 19/203 235/379 |
| 2011/0246316 | A1 | 10/2011 | Cincera | |
| 2018/0082283 | A1 | 3/2018 | Sharma | |

* cited by examiner

*Primary Examiner* — Daniel A Hess
(74) *Attorney, Agent, or Firm* — Fletcher Yoder, P.C.

(57) ABSTRACT

A method may include receiving, via a processor, a request for payment of a payment amount from a first computing system. The method may also involve receiving a location of the first computing system, identifying one or more automatic teller machines (ATMs) based on the location of the first computing system, generating an image configured to cause the one or more ATMs to dispense funds that correspond to the payment amount, and sending the image to the first computing system.

20 Claims, 3 Drawing Sheets

SYSTEM FOR INCENTIVIZING TRANSITION FROM PHYSICAL CARD TO MOBILE PAY

CROSS-REFERENCE TO RELATED APPLICATION

The present disclosure is a continuation of U.S. patent application Ser. No. 17/542,898, titled "SYSTEM FOR INCENTIVIZING TRANSITION FROM PHYSICAL CARD TO MOBILE PAY," which was filed on Dec. 6, 2021, which is a continuation of U.S. patent application Ser. No. 17/129,230, titled "SYSTEM FOR INCENTIVIZING TRANSITION FROM PHYSICAL CARD TO MOBILE PAY," which was filed on Dec. 21, 2020, now U.S. Pat. No. 11,195,386, claims priority to and the benefit of U.S. Provisional Patent Application Ser. No. 62/952,750, titled "SYSTEM FOR INCENTIVIZING TRANSITION FROM PHYSICAL CARD TO MOBILE PAY," which was filed on Dec. 23, 2019, each of which is herein incorporated by reference in its entirety for all purposes.

BACKGROUND

The present disclosure relates generally to mobile payment systems. More specifically, the present disclosure relates to providing merchants with a variety of options to receive payments when dealing with mobile device payments from clients.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

The transition from physical card payments to mobile device payments is rapidly growing. Currently, many merchants accept mobile payments from various types of platforms. For example, merchants are equipped with payment terminals that can accept payments from mobile devices that include applications to tender payment for goods and services. However, some merchants do not have the particular devices to accept the tender. Indeed, certain companies will provide merchants with machines that can accept the tender from the mobile devices, but these machines may involve a certain degree of expertise that may cause merchants to shy away. As such, improved systems for incentivizing the transition from physical card payments to mobile device payments are desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include one or more automatic teller machines (ATMs) and a processor that may execute computer-executable instructions that cause the processor to perform certain actions. For example, the processor may receive a first indication of a payment amount from a first computing system, send a second indication of a confirmation of an acceptance of the payment amount to the first computing system, and send a request for payment of the payment amount to a second computing system in response to sending the second indication. The second computing system may generate an image associated with receiving the payment amount via the one or more ATMs, such that the image may cause the one or more ATMs to dispense funds that corresponds to the payment amount.

In another embodiment, a method may include receiving, via a processor, a request for payment of a payment amount from a first computing system. The method may also involve receiving a location of the first computing system, identifying one or more automatic teller machines (ATMs) based on the location of the first computing system, generating an image configured to cause the one or more ATMs to dispense funds that correspond to the payment amount, and sending the image to the first computing system.

In yet another embodiment, a non-transitory computer-readable medium may include computer-executable instructions that, when executed by a processor, may cause the processor to receive a request for payment of a payment amount from a first computing system. The processor may then receive a location of the first computing system, identify one or more automatic teller machines (ATMs) based on the location of the first computing system, generate an image that may cause the one or more ATMs to dispense funds that correspond to the payment amount, and send the image to the first computing system.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, payments systems are rapidly transitioning from physical card payments to payments made via mobile devices. To enable merchants to accept payments via mobile devices, the presently disclosed embodiments detail certain systems and methods for enabling merchants to accommodate the mobile device payment method. In one embodiment, a merchant computing system may receive an indication of payment to a merchant from a mobile device. The merchant computing system may send a notification to a banking computing system, which may enable the merchant to receive the accepted mobile payment in the form of cash from a local automatic teller machine (ATM). Alternatively, the banking computing system may issue payments or a check from a bank for their accumulated payments received via the mobile device.

Figure 1:
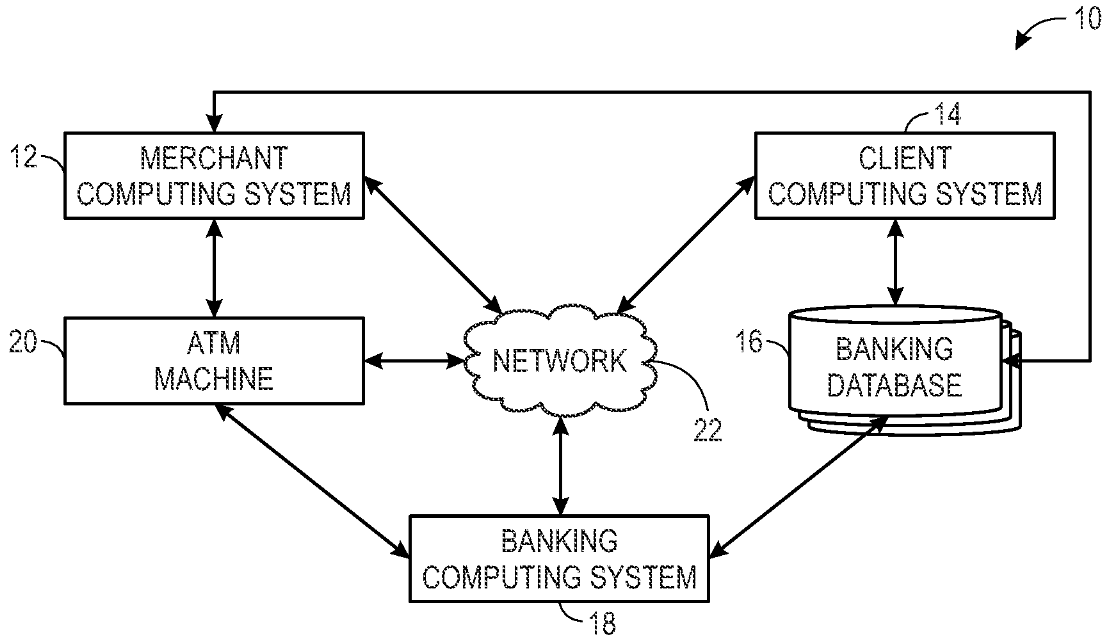
FIG. 1 illustrates a payment system, in accordance with embodiments described herein.

By way of introduction, FIG. 1 illustrates a payment system 10 that includes certain components, electronic devices, and a collection of electronic devices that enable different computing systems to perform the methods described herein. As shown in FIG. 1, the payment system 10 may include a merchant computing system 12, client computing system 14, banking computing system 18, and automatic teller machines (ATM) machines 20 that may be communicatively coupled to a network 22. The network 22 may be any suitable computer network that enables different electronic devices (e.g., servers), communication components (e.g., routers), and the like to facilitate the communication between the merchant computing system 12 and other components that may be part of the payment system 10.

Figure 2:
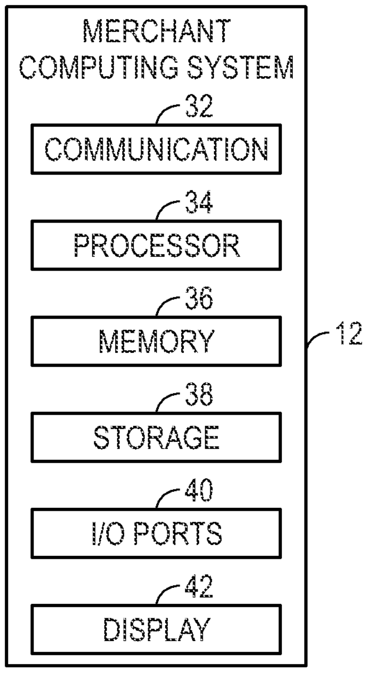
FIG. 2 illustrates a block diagram of a merchant computing system employed by the payment system of FIG. 1, in accordance with embodiments described herein.

The merchant computing system 12 may be any suitable computing device, which is discussed in more detail below with reference to FIG. 2. In certain embodiments, the merchant computing system 12 may be a mobile phone or smart phone that is equipped with a camera and capable of sending and receiving data over cellular towers, satellites, or other suitable mediums. In another embodiment, the merchant computing system 12 may be a computing device (e.g., a laptop computer, a personal computer, tablet, server, smart phone, and the like), which may also be equipped with a camera or a laser scanner capable of reading one-dimensional (1D) and two-dimensional (2D) images, such as barcodes or quick response (QR) codes.

A potential customer may interact with the merchant computing system 12 by way of the client computing system 14. The client computing system 14 may be any suitable computing device, similar to the merchant computing system 12 that is discussed in more detail below with reference to FIG. 2. In certain embodiments, the client computing system 14 may be a mobile computing device (e.g., smart phone, tablet), a laptop computer, a personal computer, and the like that is capable of tendering payment for goods or services.

With the foregoing in mind, the merchant computing system 12 may receive a payment indication from the client computing system 14. If the payment is accepted via the merchant computing system 12, the merchant computing system 12 may then provide the client computing system 14 with an interactive visualization that displays payment information and requests for a user input to verify and accept the payment. Additional details with regard to the process undertaken by the merchant computing system 12 and the client computing system 14 will be discussed below with reference to FIGS. 3 and 4.

In some embodiments, to perform its respective operations, the merchant computing system 12 may retrieve data from one or more banking databases 16. The banking databases 16 may include data concerning the user of the client computing system 14, the user of the merchant computing system 12, and bank account information (e.g., account numbers, balances, phone numbers, addresses, and the like). In addition, the banking databases 16 may include information regarding ATMs, such as an amount of cash that they currently contain, locations of affiliated machines (e.g., affiliated with bank or client), locations of non-affiliated machines, and any associated fees pertaining to each particular machine.

The banking computing system 18 may be any suitable computing device, similar to the merchant computing system 12 that is discussed in more detail below with reference to FIG. 2. In certain embodiments, the banking computing system 18 may be a mobile computing device (e.g., smart phone, tablet), a laptop computer, a personal computer, a server computer, and the like.

Figure 5:
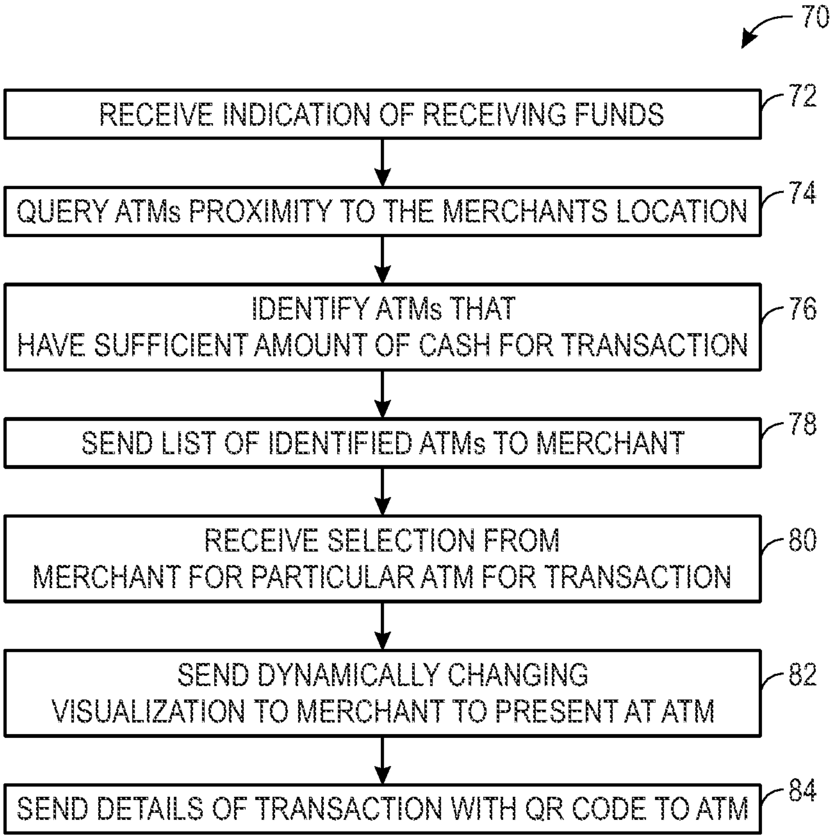
FIG. 5 illustrates a flow chart of a method for a banking computing system to facilitate payment to a merchant in accordance with embodiments described herein.

With the foregoing in mind, the merchant computing system 12 may receive a request from the banking computing system 18 to select a payment preference. After a merchant selects his/her preference through the merchant computing system 12, the merchant computing system 12 may send the banking computing system 18 a signal representative of the selection. The merchant computing system 12 may then dynamically change a visualization to be presented to the merchant. Additional details with regard to the process undertaken by the merchant computing system 12 and the banking computing system 18 will be discussed below with reference to FIGS. 3 and 5.

The ATMs 20 may be any suitable automatic teller machine that is capable of dispensing cash to a designated user. In some embodiments, the ATMs 20 are equipped with sensors that are able to internally keep track of the amount of money that is currently held within the ATMs 20. In another embodiment, the ATMs 20 are capable of determining their location using a global positioning system. In certain embodiments, the ATMs 20 are able to send and receive indications and requests via a network 22 to the merchant computing system 12, the client computing system 14, or the banking computing system 18. In another embodiment, the ATMs 20 may send periodic updates to banking databases 16 regarding the respective locations of the ATMs 20, amount of cash stored at the respective ATMs 20, operational states of the respective ATMs 20, and the like.

In certain embodiments, the merchant computing system 12, the client computing system 14, the banking databases 16, the banking computing system 18, and the ATMs 20 may be in direct communication with one another via a respective communication channel. However, it should be noted that each of the aforementioned devices may also be coupled to each other via the network 22, as discussed above.

To perform some of the operations described in the present disclosure, the merchant computing system 12 may include certain components to facilitate these operations. With this in mind, FIG. 2 is a block diagram of example components within the merchant computing system 12. Referring to FIG. 2, the merchant computing system 12 may include a communication component 32, a processor 34, a memory 36, a storage 38, input/output (I/O) ports 40, a display 42, and the like. The communication component 32 may be a wireless or wired communication component that may facilitate communication between the merchant computing system 12, the client computing system 14, the banking databases 16, the banking computing system 18, the ATMs 20, the network 22, and the like.

The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store data, analysis of acquired data, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, laser scanner, mouse, microphone), sensors, input/output (I/O) modules, and the like. The display 42 may operate to depict visualizations associated with software or executable code being processed by the processor 34. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen).

It should be noted that the components described above with regard to the merchant computing system 12 are exemplary components and the merchant computing system 12 may include additional or fewer components as shown. Additionally, it should be noted that the client computing system 14 and the banking computing system 18 may also include similar components as described as part of merchant computing system 12.

Although the embodiments described herein are detailed as being performed by the merchant computing system 12, it should be noted that the presently disclosed techniques may be performed in conjunction with a cloud-based computing system, a server, or the like. For example, the merchant computing system 12 may receive an indication of a payment, and the merchant computing system 12 may perform some analysis or operations described herein with the additional computing resources provided by a server, a cloud-computing system, or the like. In some embodiments, the merchant computing system 12 may use a computing application, which may be stored in the memory 36, and executed by the processor 34 to perform the embodiments described herein. The computer application may access the computing resources of the merchant computing system 12 to perform its operations or interact with the computing resources of another connected computing system (e.g., cloud-computing system). In any case, for the purposes of discussion, the presently disclosed techniques will be described as being performed by merchant computing system 12. As such, it should be understood that the presently disclosed techniques are not limited to being performed by the merchant computing system 12.

Figure 3:
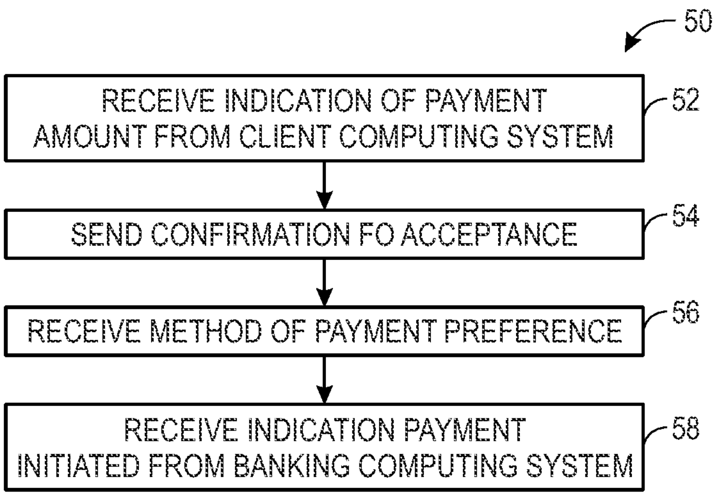
FIG. 3 illustrates a flow chart of a method for a merchant computing system to receive a payment, in accordance with embodiments described herein.
Figure 4:
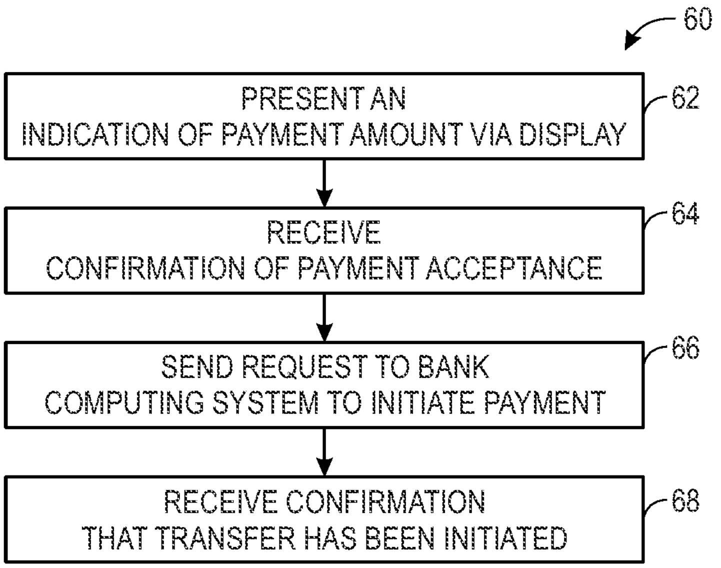
FIG. 4 illustrates a flow chart of a method for a client computing system to make a payment, in accordance with embodiments described herein.

Keeping the foregoing in mind, FIG. 3 illustrates a flow chart of a method 50 in which the merchant computing system 12 may receive an indication of a payment via a mobile payment platform. The merchant computing system 12 may then receive a selection of a type of and delivery method of the payment. As such, the merchant computing system 12 may provide the merchant the ability to receive payment without owning hardware or equipment for receiving mobile payments. It should be noted that although method 50 is described below in a particular order, it should be understood that the method 50 may be performed in any suitable order.

Referring now to FIG. 3, at block 52, the merchant computing system 12 may receive an indication of a payment amount from the client computing system 14. The payment amount may be received from any suitable electronic device including a mobile phone, a computing device, or the like. In some embodiments, the indication may include an amount, sender identification information, a list of items or services to be exchanged for the payment, bank information related to a source of funds, and the like. In certain embodiments, the indication may be received via a barcode, a QR code, or other suitable machine-readable image data generated by the client computing system 14 for transmitting a payment. Since the reception and notification for receiving the payment amount may be a condition or precursor for additional actions to take place, the indication received at block 52 may cause the merchant computing system 12 to automatically execute an application and/or perform the remaining portion of the method 50 upon receipt. That is, the communication or data packets that include the indication may cause the merchant computing system 12 to automatically perform certain actions regardless of whether an application associated with the method 50 is currently active and being executed or not. Indeed, if the application is not active or being executed, the receipt of the indication may cause the merchant computing system 12 to execute it and perform the remaining portion of the method 50. Additional details with regard to how the client computing system 14 may operate prior to and after sending the indication will be described below with reference to FIG. 4.

After the merchant computing system 12 receives the indication of payment, at block 54, the merchant computing system 12 may send a confirmation of acceptance of the payment to the client computing system 14, the banking computing system 18, or both in response to the merchant computing system 12 receiving a confirmation input from the merchant. As such, the merchant computing system 12 may present an interactive visualization that may receive inputs related to a confirmation of acceptance of payment, modification with regard to certain details or parameters for accepting/receiving the payment, or the like. In some embodiments, prior to providing the confirmation input to the client computing system 14, the merchant can edit parameters of the transaction via the merchant computing system 12. For example, there may be an error in price or the merchant may want to adjust the quantity of items being sold.

In certain embodiments, before requesting acceptance from the client computing system 14, the banking computing system 18, or both, the merchant computing system 12 may query the banking databases 16 to first confirm sufficient funds in the client's account and to confirm the client's identity. In another embodiment, the merchant computing system 12 may be equipped with a wireless transceiver (e.g., an RFID sensor or Bluetooth) to receive payment information from the client computing system 14. Additional details with regard to how the banking computing system 18 will be described below with reference to FIG. 5.

After receiving an indication of acceptance of the payment, the merchant computing system 12 may proceed to block 56 and send a request to the banking computing system 18 indicative of a preference on a method for transferring the funds to the merchant. In some embodiments, the merchant can send this request after receiving each individual payment, at the end of a day, end of a week, or after some period of time allowing for the accumulation of various payments from various clients. In certain embodiments, if the merchant is accumulating various payments from various clients, then the banking computing system 18 may open a temporary bank account to hold the payments until a payment preference is received from the merchant computing system 12. For example, the banking computing system 18 may store the payments or record the payments on a distributed ledger, such as a block chain, to preserve the funds in a temporary account until the merchant specifies a payment preference. In some embodiments, the distributed ledger that serves as the temporary account may be terminated, such that additional payments may not be stored or transferred to the distributed ledger. In this way, funds from different transactions may be accounted for using specific temporary accounts digitally recorded in a distributed ledger.

In certain embodiments, the banking computing system 18 may use the banking databases 16 to query the merchant's name or address to determine if the merchant has an existing bank account to use to store the payments. In some embodiments, the merchant may send a request to the banking computing system 18 requesting that a check be mailed to them. In some embodiments, the banking computing system 18 may query a banking database 16 to determine the merchant's location and physical address to mail a check, a distributed ledger or blockchain identity to transfer funds, and the like. In certain embodiments, the banking computing system 18 may use global position system data to determine the merchant's location and the relevant bank account, address, or distributed ledger data may be determined based on an affiliation between the merchant's location and a known account data. In some embodiments, the merchant computing system 12 may send a request to the banking computing system 18 requesting that their funds be made available at ATMs 20 proximate to the merchant's location. As such, the merchant computing system 12 may send location data related to its current location to identify the ATMs 20 that may be positioned within a distance or proximity of the location of the merchant computing system 12. In another embodiment, the merchant computing system 12 may send a request to the banking computing system 18 requesting that their funds be transferred to a corresponding distributed ledger.

After the merchant computing system 12 sends the payment preference, at block 58, the merchant computing system 12 may receive an indication from the banking computing system 18 that the payment has been initiated. In some embodiments, the indication sent by the banking computing system 18 can be in the form of a short message service (SMS), an email sent to the merchant, or another suitable communication medium. The message received by the merchant computing system 12 may cause the merchant computing system 12 to automatically execute an application or process as described above. In certain embodiments, the confirmation sent by the banking computing system 18 may include a bar code or QR code that dynamically changes periodically, such that it may be used at the ATMs 20 for the merchant to receive payments. For example, the banking computing system 18 may send data of a dynamically changing QR code to the merchant computing system 12 that changes every 30 seconds to present at scanners coupled to the ATMs 20. The data sent to the merchant computing system 12 may also include a location of an ATM machine 20 that is authorized to distribute the funds. In this way, the banking computing system 18 may provide improved security by specifying just one ATM machine 20 to complete the transaction. However, it should be noted that in other embodiments, multiple ATMs 20 may have access to information from the banking computing system 18 to confirm the transaction and release or produce cash in the amount of the transaction.

As mentioned above, FIG. 4 illustrates a method 60 that may be employed by the client computing system 14 to complete a payment transaction with a merchant. Like the method 50, the following description of the method 60 may be performed in any suitable order and by any suitable computing device. For purposes of this discussion, method 60 will be described as being performed by the client computing system 14.

At block 62, after a client is ready to pay a merchant for goods or services, the client computing system 14 may present an indication of the payment amount via a display. In some embodiments, the indication contains information about the goods or services, time and date, the merchant's information, and the like.

At block 64, the client computing system 14 may receive a confirmation of the payment information, such that the merchant may receive the payment. In some embodiments, a visualization for receiving an input indicative of the acceptance will automatically populate the display of the client computing system 14 after the client computing system 14 receives the confirmation payment information. In certain embodiments, a signal indicating confirmation of the payment may be received via a user component or link presented via the visualization.

After receiving the confirmation, at block 66, the client computing system 14 may send a request to the banking computing system 18 to initiate the payment. In certain embodiments, the banking computing system 18 may query the banking databases 16 to confirm that the client has sufficient funds to carry out the transaction. In another embodiment, the client computing system 14 may present a notification requesting to receive biometric data from the client in response to receiving the confirmation. That is, the client computing system 14 may automatically generate the notification after receiving the confirmation to expedite the completion of the transaction. After receiving the biometric data, the client computing system 14 may send it to the banking computing system 18, which can cross reference the biometric data with the banking databases 16 to authenticate the identity of the client. For example, the client computing system 14 may scan the fingerprint, eye, face, or obtain other biometric data of the client and send the biometric data to the banking computing system 18 to initiate the payment. The banking computing system 18 may use the biometric data to confirm the identity of the client based on the records of the banking databases 16. In another embodiment, the banking databases 16 may log a record of the biometric information used for the transaction in a storage component, a distributed ledger, or the like.

Following a request being sent to the banking computing system 18 to initiate payment, at block 68 the client computing system 14 may receive a confirmation from the banking computing system 18 that the transfer has been initiated. In some embodiments, the indication can be a notification that is sent to the client computing system 14. The notification may be displayed via the display of the client computing system 14 and may cause the client computing system 14 to automatically present the visualization of the notification as discussed above.

As mentioned above, FIG. 5 illustrates a method 70 that may be employed by the banking computing system 18 to deliver payment from a client to a merchant. Like the method 50, the following description of the method 70 may be performed in any suitable order and by any suitable computing device. For purposes of this discussion, method 70 will be described as being performed by the banking computing system 18.

At block 72, the banking computing system 18 receives an indication of funds being received. In some embodiments, the indication may include bank account data or a location. For example, the merchant's information may be provided, such that the banking computing system 18 may cross reference the banking databases 16 to determine if the merchant has an existing account. In certain embodiments, the banking computing system 18 may determine that the merchant may not have an affiliated account so a temporary account may be created to store funds until the merchant sends a request with a payment preference.

At block 74, the banking computing system 18 may query ATMs 20 that are proximate to a location associated with the merchant. In some embodiments, the banking computing system 18 may identify ATMs 20 based on a merchant's proximity preference. For example, the merchant may request to receive cash from the ATMs 20 that are within a 5-mile radius. In some embodiments, the banking computing system 18 may use a global positioning system sensor to determine a location of the merchant computing system 12. In another embodiment, the banking computing system 18 may send a request to the merchant computing system 12 to determine the location of the merchant. In certain embodiments the banking computing system 18 may use banking databases 16 to cross reference the merchant's name and other information to determine the merchant's location and identify proximate ATMs 20.

After a list of proximate ATMs 20 are determined, at block 76, the banking system 18 may identify ATMs 20 that have sufficient funds to complete the payment to the merchant. In some embodiments, the ATMs 20 may send data to the banking computing system 18 related to an amount of cash that each of the ATMs 20 store, and the banking computing system 18 can communicate with the ATMs 20 to determine the respective amounts. In another embodiment, the ATMs 20 periodically update the banking databases 16 with data regarding the amount of cash that is currently in each of the ATMs 20, including a number of different valued notes stored therein. For example, after the banking computing system 18 identifies the ATMs 20 that are proximate to the merchant computing system 12, the banking computing system 18 may access the banking databases 16 to further narrow the list of potential ATMs 20 based on requested values of notes (e.g., $1, $5, $20) to provide to a merchant.

At block 78, a list of identified ATMs 20 is sent to the merchant computing system 12. The merchant can then select which of the ATMs 20 that he would like to use via a visualization presented on a display. In some embodiments, the list of identified ATMs 20 may contain information that indicates a bank that is affiliated with the respective ATM machine 20. In another embodiment, the list of identified ATMs 20 can contain information that indicates if there will be a fee associated with the use of a particular ATM machine 20. For example, the merchant may be a member a specific banking entity but the ATM machine 20 that is selected from the list of identified ATMs 20 is not affiliated with the merchant's bank, and a fee amount for performing the transaction is displayed.

At block 80, the banking computing system 18 may receive the selection from the merchant computing system 12 from the list of identified ATMs 20. In some embodiments, the merchant computing system 12 may receive a selection of ATMs 20 to use from the list of ATMs 20 in an order based on the merchant's preference. For instance, the list will be organized based on proximity to the location of the merchant computing system 12. In some embodiments, the banking computing system 18 may query the banking databases 16 to determine if the merchant has a list of preferred ATMs 20.

At block 82, the banking computing system 18 may send a dynamically changing or static visualization to the merchant computing system 12 to present at ATMs 20. In some embodiments, the dynamically changing visualization may be a bar code or QR code that changes periodically. For example, the banking computing system 18 can generate a QR code and send it to the merchant computing system 12 so the merchant may present the QR code to the ATMs 20 to cause the ATMs 20 to provide funds. A new QR code can be automatically sent every 20 seconds, for example, or requested by the merchant to ensure security. As such, the ATM machine 20 that receives the QR code or image may validate the code based on the time in which the code is received and whether the code corresponds to a valid time period. In addition, visualization may also be in the form of a bar code or QR code that the banking computing system 18 sends to the merchant via SMS messaging or email to be printed and presented at the ATMs 20. In some embodiments, the bar code or QR code that is sent to the merchant via SMS or email and may have an expiration time.

At block 84, the banking computing system 18 may send the ATM machine 20 data that corresponds to the bar code or QR code that is sent to the merchant computing system 12. In some embodiments, the banking computing system 18 sends the ATMs 20 a new set of data relating to the bar code or QR code that is sent to the merchant computing system 12 every time there is a new bar code or QR code issues to the merchant computing system 12. For example, the banking computing system 18 may refresh the QR code sent to the merchant every 20 seconds, so new data may also be sent to the ATMs every 20 seconds to correspond to the new QR code. In another embodiment, the banking computing system 18 may send the ATMs 20 biometric data of the merchant, such that the merchant can use a biometric sensor used at the ATMs 20 instead of a QR code or bar code to receive funds. For example, the banking computing system 18 may receive biometric data from the merchant computing system 12 or the banking databases 16, such as a fingerprint data, retinal data, or facial data and send the data to the ATMs 20. Subsequently, the ATMs 20 can complete a transaction with a corresponding biometric scan at the ATMs 20 in addition to or without an accompanying QR code or bar code.

By coordinating the payment operations using the systems and techniques described herein, the present embodiments enable client computing systems, merchant computing systems, and banking computing systems to operate more efficiently to authorize and disperse funds. Indeed, the authentication process may be efficiently performed during the course of a transaction by sending transaction data, biometric data, and payment data during the same time period. Moreover, since the coordination of the transaction occurs in real time or near real time, the present embodiments enable merchants to have access to funds immediately after a transaction occurs without waiting for funds to clear through clearing houses and the like. Moreover, by identifying ATMs that are within a proximity of an individual or device, the present embodiments preserve or maximize network bandwidth by transmitting data to a limited number of devices in an area, as opposed to a large number of ATMs that may be associated with a bank. Indeed, by sending data directly to the ATMs, the present embodiments also provide improved security in that data that is compromised or acquired by malicious entities may not be able to use the misappropriated data on any ATMs.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:

a processing system configured to execute computer-executable instructions that cause the processing system to:

receive a first plurality of indications of a plurality of payment amounts associated with a plurality of purchases from a plurality of computing systems;

send a second plurality of indications of a plurality of confirmations of a plurality of acceptances of the plurality of payment amounts to the plurality of computing systems;

send one or more requests for one or more payments of at least a portion of the plurality of payment amounts to a bank computing system;

a banking computing system configured to:

update a digital ledger to indicate that the one or more payments of the at least a portion of the plurality of payment amounts is received in a temporary account when a payment preference is not received from the processing system;

receive a payment preference from the processing system;

generate a machine-readable code associated with receiving the one or more payments via one or more automatic teller machines (ATMs) wherein the machine-readable code is configured to cause the one or more ATMs to dispense funds that correspond to the one or more payments; and send the machine-readable code to the processing system.

2. The system of claim 1, wherein the machine-readable code comprises a dynamically changing quick response (QR) code.

3. The system of claim 1, wherein the temporary account is terminated after the machine-readable code is generated.

4. The system of claim 1, wherein the processing system is configured to present an interactive visualization configured to receive one or more inputs related to at least a portion of the second plurality of indications.

5. The system of claim 4, wherein the one or more inputs are indicative of one or more changes to at least a portion of the plurality of payment amounts.

6. The system of claim 1, wherein the bank computing system is configured to:

identify a first ATM of the one or more ATMs based on a location of the processor; and generate the machine-readable code associated with receiving the one or more payments based on the first ATM, wherein the machine-readable code is configured to cause the first ATM to dispense the funds that corresponds to the one or more payments.

7. The system of claim 1, wherein the plurality of payment amounts corresponds to a day, a week, or a number of days.

8. A method, comprising:

receiving, via a computing system, a first plurality of indications of a plurality of payment amounts associated with a plurality of purchases from a plurality of computing systems;

sending, via the computing system, a second plurality of indications of a plurality of confirmations of a plurality of acceptances of the plurality of payment amounts to the plurality of computing systems;

sending, via the computing system, one or more requests for one or more payments of at least a portion of the plurality of payment amounts to a bank computing system; and receiving, via the computing system, one or more indications of the one or more payments being received by the bank computing system, wherein the banking computing system configured to:

update a digital ledger to indicate that the one or more payments is received in a temporary account when a payment preference is not received from the computing system;

receive a payment preference from the processing system;

generate a machine-readable code associated with receiving the one or more payments via one or more automatic teller machines (ATMs) wherein the machine-readable code is configured to cause the one or more ATMs to dispense funds that correspond to the one or more payments; and send the machine-readable code to the processing system.

9. The method of claim 8, wherein the digital ledger comprises a blockchain.

10. The method of claim 8, wherein the machine-readable code is configured to cause the one or more ATMs to dispense funds that corresponds the one or more payments.

11. The method of claim 8, wherein the machine-readable code comprises a dynamically changing quick response (QR) code.

12. The method of claim 8, wherein the machine-readable code comprises a dynamically changing bar code.

13. The method of claim 8, wherein the first plurality of indications is received over a period of time.

14. The method of claim 13, wherein the period of time corresponds to number of days.

15. A non-transitory computer-readable medium comprising computer-executable instructions that, when executed by a processor, is configured to cause the processor to:

receive a first plurality of indications of a plurality of payment amounts associated with a plurality of purchases from a plurality of computing systems;

send a second plurality of indications of a plurality of confirmations of a plurality of acceptances of the plurality of payment amounts to the first plurality of computing systems;

send one or more requests for one or more payments of at least a portion of the plurality of payment amounts to a bank computing system; and receive one or more indications of the one or more payments being received by the bank computing system, wherein the banking computing system configured to:

update a digital ledger to indicate that the one or more payments is received in a temporary account when a payment preference is not received from the processing system;

receive a payment preference from the processing system;

generate a machine-readable code associated with receiving the one or more payments via one or more automatic teller machines (ATMs,) wherein the machine-readable code is configured to cause the one or more ATMs to dispense funds that correspond to the one or more payments; and send the machine-readable code to the processing system.

16. The transitory computer-readable medium of claim 15, wherein the distributed ledger comprises a blockchain.

17. The transitory computer-readable medium of claim 15, wherein the machine-readable code is configured to cause the one or more ATMs to dispense funds that corresponds the one or more payments.

18. The transitory computer-readable medium of claim 15, wherein the machine-readable code comprises a dynamically changing quick response (QR) code.

19. The transitory computer-readable medium of claim 15, wherein the machine-readable code comprises a dynamically changing bar code.

20. The transitory computer-readable medium of claim 15, wherein the first plurality of indications is received over a period of time.

* * * * *